(12) United States Patent
Eisenberg

(10) Patent No.: US 11,448,866 B2
(45) Date of Patent: Sep. 20, 2022

(54) UNIT MAGNIFICATION MICROSCOPE

(71) Applicant: OMEK OPTICS LTD., Givat Ella (IL)

(72) Inventor: Shai Eisenberg, Givat Ella (IL)

(73) Assignee: OMEK OPTICS LTD., Givat Ella (IL)

( * ) Notice: Subject to any disclaimer, the term of this patent is extended or adjusted under 35 U.S.C. 154(b) by 0 days.

(21) Appl. No.: 17/424,221

(22) PCT Filed: Feb. 4, 2020

(86) PCT No.: PCT/IB2020/050866
§ 371 (c)(1),
(2) Date: Jul. 20, 2021

(87) PCT Pub. No.: WO2020/188368
PCT Pub. Date: Sep. 24, 2020

(65) Prior Publication Data
US 2022/0099953 A1   Mar. 31, 2022

Related U.S. Application Data

(60) Provisional application No. 62/820,325, filed on Mar. 19, 2019.

(51) Int. Cl.
*G02B 21/00* (2006.01)
*G02B 13/22* (2006.01)
(Continued)

(52) U.S. Cl.
CPC .......... *G02B 21/025* (2013.01); *G02B 13/22* (2013.01); *G02B 13/26* (2013.01); *G02B 21/06* (2013.01); *G02B 21/361* (2013.01)

(58) Field of Classification Search
CPC ...... G02B 21/00; G02B 21/02; G02B 21/025; G02B 21/06; G02B 21/245; G02B 21/36;
(Continued)

(56) References Cited

U.S. PATENT DOCUMENTS 4,205,894 A  *  6/1980  Filipovich ............... G02B 7/06
                                                          359/513
4,549,204 A    10/1985  Bertero et al.
(Continued)

FOREIGN PATENT DOCUMENTS

DE    102013105586 A1    12/2014
EP        1015869 A1     7/2000
(Continued)

*Primary Examiner* — Thong Q Nguyen
(74) *Attorney, Agent, or Firm* — Mark M. Friedman

(57) ABSTRACT

A unit magnification microscope includes a first lens assembly (20) with a number of lenses forming an infinity-corrected objective and a second lens assembly (22), identical to the first lens assembly, deployed in an opposite orientation along a light path. A physical stop (26) is located at a central point along the light path between the lens assemblies. A focal plane array image sensor (28) is mounted at the external focal plane of the second lens assembly, such that light from an object at an object plane (30) is focused with unit magnification on the focal plane array image sensor after passing along the light path through the first lens assembly, the physical stop and the second lens assembly. A beam splitter (34) may be used to introduce illumination along the light path.

16 Claims, 13 Drawing Sheets

(51) Int. Cl.
  *G02B 21/02* (2006.01)
  *G02B 13/26* (2006.01)
  *G02B 21/06* (2006.01)
  *G02B 21/36* (2006.01)

(58) Field of Classification Search
  CPC ...... G02B 21/361; G02B 13/22; G02B 13/36;
           G02B 15/02; G02B 21/0032; G02B 13/26
  USPC ................ 359/368–398, 663, 434–435, 629,
           359/637–640, 368–390, 422, 432,
           359/656–661, 738–740
  See application file for complete search history.

(56) References Cited

U.S. PATENT DOCUMENTS

| | | |
|---|---|---|
| 4,731,795 A | 3/1988 | Clark et al. |
| 5,684,629 A | 11/1997 | Leiner |
| 5,696,631 A * | 12/1997 | Hoffman .............. G02B 13/143 |
| | | 359/663 |
| 5,754,291 A * | 5/1998 | Kain ....................... G02B 21/02 |
| | | 356/338 |
| 6,005,709 A | 12/1999 | Silver |
| 6,411,435 B1 | 6/2002 | Hall |
| 6,490,085 B1 | 12/2002 | Zobel |
| 6,867,915 B2 | 3/2005 | Mueller et al. |
| 7,081,994 B2 | 7/2006 | Mueller et al. |
| 7,139,074 B2 * | 11/2006 | Reel ..................... G01J 3/0208 |
| | | 356/328 |
| 7,436,591 B2 | 10/2008 | Mizusawa |
| 8,705,041 B2 | 4/2014 | Eckman et al. |
| 9,733,460 B2 | 8/2017 | Kang et al. |
| 2004/0032650 A1 | 2/2004 | Lauer |
| 2007/0053246 A1 | 3/2007 | Martin et al. |
| 2008/0266655 A1 | 10/2008 | Levoy et al. |
| 2009/0040603 A1 | 2/2009 | Nagahama et al. |
| 2015/0103413 A1 | 4/2015 | Uchida |
| 2018/0364473 A1 | 12/2018 | Khettal et al. |

FOREIGN PATENT DOCUMENTS

| | | |
|---|---|---|
| WO | 1995035522 A1 | 12/1995 |
| WO | 2016090336 A1 | 6/2016 |
| WO | 2018122814 A1 | 7/2018 |

* cited by examiner

| Surface # | Radius | Thickness | Glass | Surf. Diam. |
|---|---|---|---|---|
| OBJ | Infinity | 9 | | 4.5 |
| 1 | -16.79763 | 1.906077 | LAFN21 | 6 |
| 2 | -12.90051 | 0.2 | | 7 |
| 3 | 49.31035 | 1.5 | SF6 | 7 |
| 4 | 6.376959 | 3.5 | LAF3 | 7 |
| 5 | -29.56952 | 1.830641 | | 7 |
| 6 | 27.50248 | 2.5 | LASF3 | 7 |
| 7 | -30.56291 | 2 | LLF1 | 7 |
| 8 | 118.0255 | 3 | | 7 |
| STOP | Infinity | 3 | | 3.4 |
| 10 | -118.0255 | 2 | LLF1 | 7 |
| 11 | 30.56291 | 2.5 | LASF3 | 7 |
| 12 | -27.50248 | 1.830641 | | 7 |
| 13 | 29.56952 | 3.5 | LAF3 | 7 |
| 14 | -6.376959 | 1.5 | SF6 | 7 |
| 15 | -49.31035 | 0.2 | | 7 |
| 16 | 12.90051 | 1.906077 | LAFN21 | 7 |
| 17 | 16.79763 | 9 | | 6 |
| IMA | Infinity | | | 4 |

| Surface | Spherical S1 | Coma S2 | Astigmatism S3 | Field Curvature S4 | Distortion S5 | Axial Color | Lateral Color |
|---|---|---|---|---|---|---|---|
| 1 | 0.000512 | -0.000567 | 0.000628 | -0.000572 | -0.000062 | -0.000846 | 0.000937 |
| 2 | -0.000002 | -0.000039 | -0.000728 | 0.000745 | 0.000310 | -0.000075 | -0.001404 |
| 3 | 0.002990 | -0.000634 | 0.000134 | 0.000197 | -0.000070 | -0.004065 | 0.000862 |
| 4 | -0.005432 | -0.001179 | -0.000256 | -0.000097 | -0.000077 | 0.008110 | 0.001760 |
| 5 | -0.000001 | 0.000013 | -0.000324 | 0.000308 | 0.000413 | 0.000051 | -0.001271 |
| 6 | 0.002499 | -0.000801 | 0.000257 | 0.000354 | -0.000196 | -0.003070 | 0.000984 |
| 7 | 0.000156 | 0.000127 | 0.000104 | 0.000086 | 0.000140 | -0.000730 | -0.000598 |
| 8 | -0.000002 | 0.000010 | -0.000041 | -0.000065 | -0.000448 | 0.000263 | -0.001114 |
| STO | 0.000000 | 0.000000 | 0.000000 | 0.000000 | 0.000000 | 0.000000 | 0.000000 |
| 10 | -0.000002 | -0.000009 | -0.000040 | -0.000065 | -0.000448 | 0.000261 | 0.001114 |
| 11 | 0.000156 | -0.000128 | 0.000105 | 0.000086 | 0.000140 | -0.000731 | 0.000598 |
| 12 | 0.002494 | 0.000800 | 0.000256 | 0.000354 | 0.000196 | -0.003069 | -0.000984 |
| 13 | 0.000000 | -0.000012 | -0.000324 | 0.000308 | 0.000413 | 0.000049 | 0.001272 |
| 14 | -0.005441 | 0.001181 | -0.000256 | -0.000097 | 0.000077 | 0.008118 | -0.001762 |
| 15 | 0.002988 | 0.000634 | 0.000134 | 0.000197 | 0.000070 | -0.004066 | -0.000862 |
| 16 | -0.000002 | 0.000040 | -0.000728 | 0.000745 | -0.000311 | -0.000078 | 0.001405 |
| 17 | 0.000510 | 0.000566 | 0.000628 | -0.000572 | 0.000062 | -0.000845 | -0.000938 |
| IMA | 0.000000 | 0.000000 | 0.000000 | 0.000000 | 0.000000 | 0.000000 | 0.000000 |
| TOT | 0.001422 | 0.000001 | -0.000450 | 0.001871 | -0.000001 | -0.000724 | -0.000001 |

Seidel Aberration Coefficients

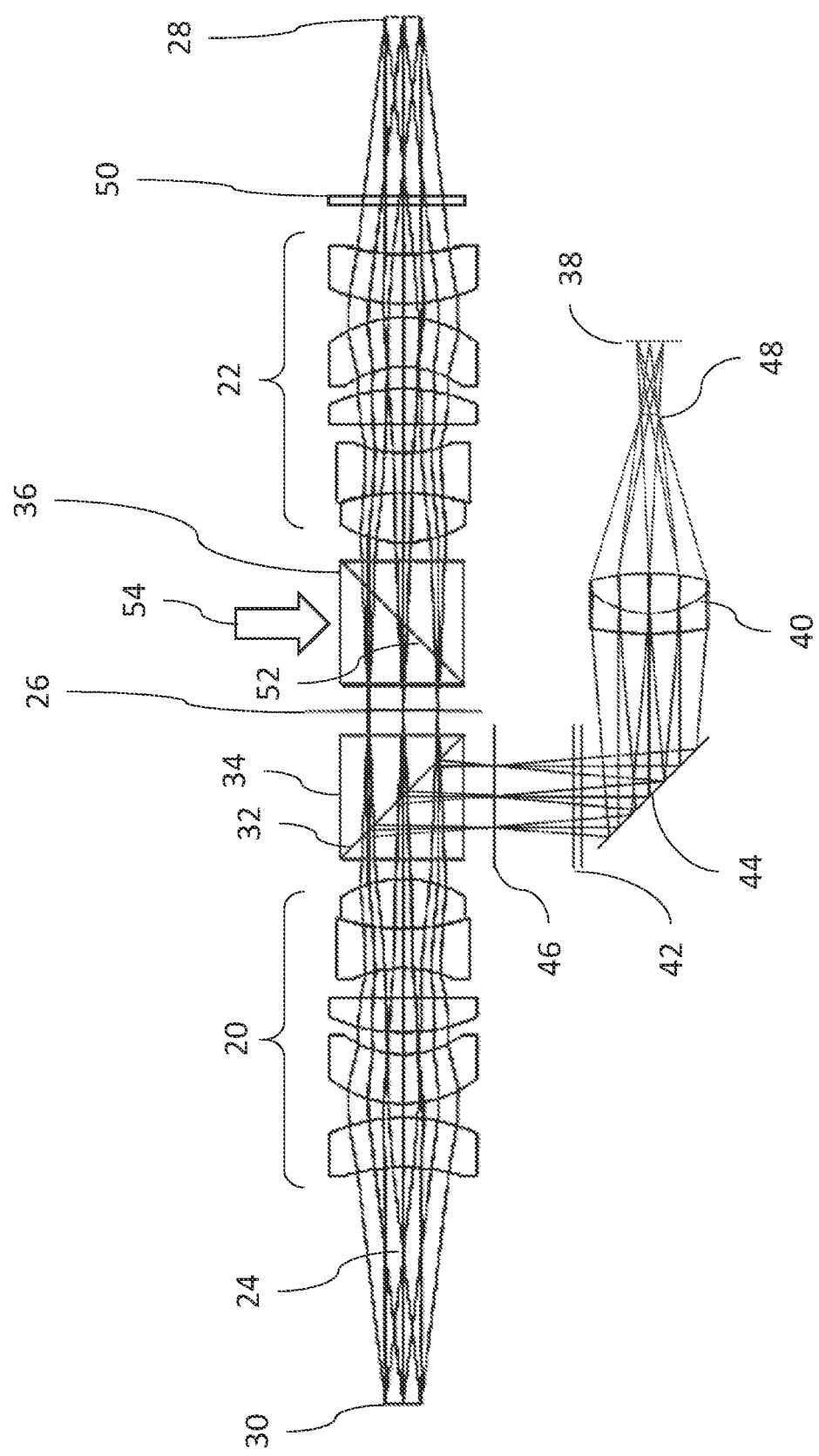

UNIT MAGNIFICATION MICROSCOPE

FIELD AND BACKGROUND OF THE INVENTION

The present invention relates to microscopes and, in particular, it concerns a unit magnification microscope.

Optical microscopes are generally constructed from an objective lens assembly (or simply "objective") and a tube lens assembly (or simply "tube lens"). The objective is typically infinity corrected, meaning that an object plane is imaged to a collimated image, which is then focused by the tube lens to an image plane. In the case of an industrial microscope, a focal plane array image sensor is positioned at the back focal plane of the tube lens. Objectives are often interchangeable, providing a range of different magnifications.

When designing lens systems for both objectives and tube lenses for high performance microscopes, the various optical elements and surfaces should be optimized to minimize multiple types of optical aberration which can impact image quality. These include spherical aberration, coma, distortion, axial and lateral chromatic aberration, astigmatism, and field curvature. Optical surfaces are typically optimized by numerical methods which try to simultaneously minimize multiple parameters corresponding to the different types of aberration. Residual aberrations are often significant, and attempts to reduce them to levels required for certain applications may lead to the use of large numbers of surfaces and consequent high complexity and cost of the microscope.

SUMMARY OF THE INVENTION

The present invention is a unit magnification microscope.

According to the teachings of an embodiment of the present invention there is provided, a unit magnification microscope comprising: (a) a first lens assembly comprising a plurality of lenses forming an infinity-corrected objective for receiving light from an object located at an external focal plane of the first lens assembly; (b) a second lens assembly comprising a plurality of lenses, the second lens assembly being identical to the first lens assembly, the second lens assembly being mounted relative to the first lens assembly in an opposite orientation along a light path; (c) a physical stop located at a central point along the light path between the first lens assembly and the second lens assembly; and (d) a focal plane array image sensor mounted at the external focal plane of the second lens assembly, such that light from the object is focused with unit magnification on the focal plane array image sensor after passing along the light path through the first lens assembly, the physical stop and the second lens assembly.

According to a further feature of an embodiment of the present invention, there is also provided a beam splitter cube and a compensating element deployed in the light path, the beam splitter cube being deployed to allow introduction into the light path of illumination directed towards the object, wherein the beam splitter cube and the compensating element have similar optical properties and are located on opposite sides of the physical stop.

According to a further feature of an embodiment of the present invention, the beam splitter cube and the compensating element are both located between the first lens assembly and the second lens assembly.

According to a further feature of an embodiment of the present invention, there is also provided an illumination source, and an illumination optical arrangement configured to direct illumination from the illumination source via the beam splitter cube into the first lens assembly.

According to a further feature of an embodiment of the present invention, the physical stop is located at a back focal plane of the first lens assembly and of the second lens assembly, and wherein the illumination optical arrangement includes an arrangement of lenses configured to generate an image of the illumination source at a plane of the physical stop or at a plane optically equivalent to the physical stop.

According to a further feature of an embodiment of the present invention, the beam splitter cube and the compensating element are located in the light path between the first lens assembly and the object or between the second lens assembly and the focal plane array image sensor.

According to a further feature of an embodiment of the present invention, the beam splitter cube includes a metallic beam splitter.

According to a further feature of an embodiment of the present invention, the beam splitter cube includes a polarizing beam splitter.

According to a further feature of an embodiment of the present invention, the beam splitter cube includes a dichroic beam splitter.

According to a further feature of an embodiment of the present invention, the compensating element is implemented as a second beam splitter cube.

According to a further feature of an embodiment of the present invention, there is also provided an optical instrument associated with the second beam splitter and employing the second beam splitter as an optical port to the microscope, the optical instrument being selected from the group consisting of: a laser illumination device; a vibrometer; and a spectrometer.

According to a further feature of an embodiment of the present invention, the first lens assembly and the second lens assembly are deployed along a common optical axis.

According to a further feature of an embodiment of the present invention, at least one lens of the first lens assembly is aligned on a first optical axis and wherein at least one lens of the second lens assembly is aligned on a second optical axis, the first and second optical axes being perpendicular.

According to a further feature of an embodiment of the present invention, at least one lens of the first lens assembly is aligned on a first optical axis and wherein at least one lens of the second lens assembly is aligned on a second optical axis, the first and second optical axes being parallel.

According to a further feature of an embodiment of the present invention, there is also provided a rigid housing supporting the first and second lens assemblies, wherein the plurality of lenses of the first lens assembly are deployed within a first hollow channel formed in the rigid housing, and wherein the plurality of lenses of the second lens assembly are deployed within a second hollow channel formed in the rigid housing.

According to a further feature of an embodiment of the present invention, the physical stop is located at a back focal plane of the first lens assembly and of the second lens assembly.

According to a further feature of an embodiment of the present invention, there is also provided at least one diagonally-deployed beam splitter located in the light path between the first lens assembly and the second lens assembly, the beam splitter being deployed to allow introduction into the light path of illumination directed towards the object.

According to a further feature of an embodiment of the present invention, the plurality of lenses of the first and second lens assemblies are refractive lenses.

According to a further feature of an embodiment of the present invention, the first and second lens assemblies are catadioptric assemblies.

According to a further feature of an embodiment of the present invention, the plurality of lenses of the first and second lens assemblies are reflective lenses.

BRIEF DESCRIPTION OF THE DRAWINGS

The invention is herein described, by way of example only, with reference to the accompanying drawings, wherein:

FIG. 1B is a table providing data defining the optical elements of the unit magnification microscope of FIG. 1A;

FIG. 1C is a table providing data regarding the contribution of each surface in the unit magnification microscope of FIG. 1A to various types of optical aberration;

FIG. 2 is a schematic representation of a variant implementation of the unit magnification microscope of FIG. 1A including a beam splitter cube to introduce illumination via the microscope;

DESCRIPTION OF THE PREFERRED EMBODIMENTS

Figure 1A:
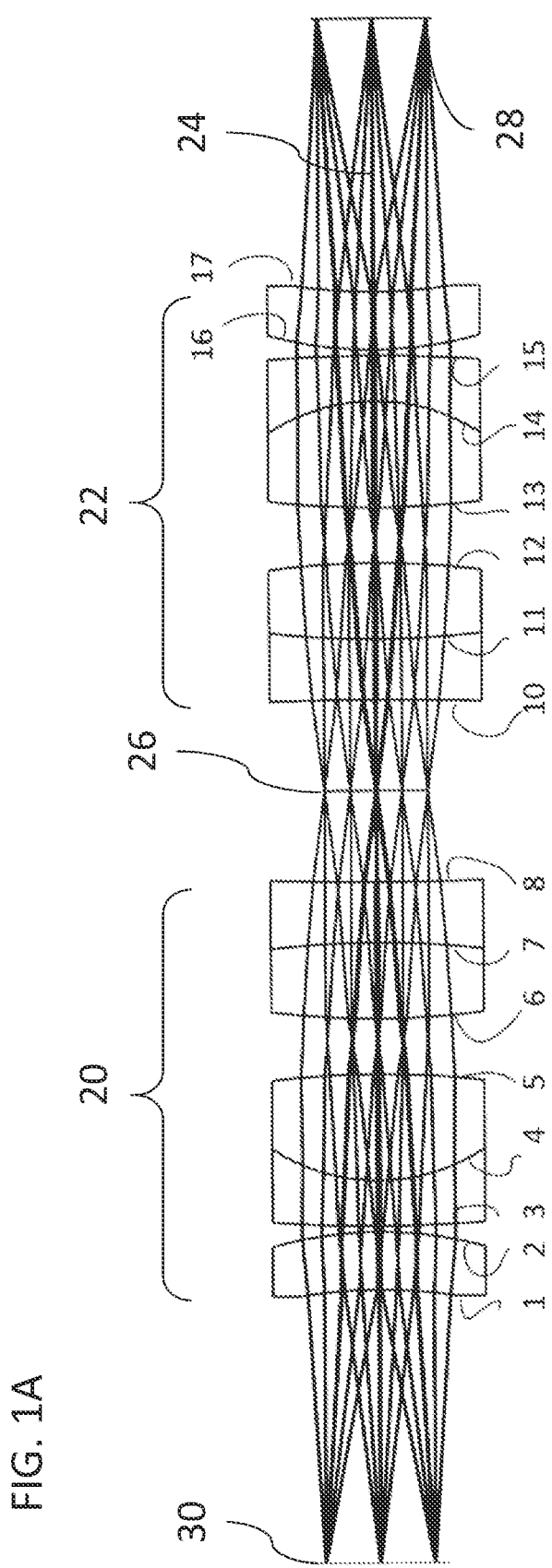
FIG. 1A is a schematic representation of a unit magnification microscope, constructed and operative according to an embodiment of the present invention.

The present invention is a unit magnification microscope.

The principles and operation of unit magnification microscopes according to the present invention may be better understood with reference to the drawings and the accompanying description.

Referring first generically to multiple variant implementations of the present invention as illustrated and described herein, in general terms, a unit magnification microscope according to certain embodiments of the present invention includes a first lens assembly 20, including a plurality of lenses forming an infinity-corrected objective, for receiving light from an object located at an external focal plane (which is also the object plane 30) of first lens assembly 20, and a second lens assembly 22, identical to first lens assembly 20, mounted relative to first lens assembly 20 in an opposite orientation along a light path (rays 24). A physical stop 26 is located at a central point along the light path between first lens assembly 20 and second lens assembly 22. A focal plane array (FPA) image sensor 28 is mounted at the external focal plane of second lens assembly 22, such that light from the object is focused with unit magnification on FPA image sensor 28 after passing along the light path through first lens assembly 20, physical stop 26 and second lens assembly 22.

Embodiments of the present invention according to the above definition provide a number of striking advantages over conventional microscopes. Firstly, the approach taught by these embodiments of the present invention is enabled by the observation that high quality microscopy can surprisingly be achieved using a unit magnification optical arrangement, due to the high pixel resolution available using currently available FPA image sensors. For example, certain particularly effective implementations of the present invention have been achieved using FPA image sensors having pixel dimensions of roughly 2.2 microns square.

Secondly, by choosing to use first and second lens assemblies which are symmetrical (identical lens arrangements arranged in the reverse orientation), it has been found that many types of optical aberration are inherently compensated for by cancelling out due to the symmetry of the optics. Specifically, an arrangement of first and second lens assemblies positioned symmetrically with respect to an aperture stop typically achieves substantially complete cancelation of coma, distortion and lateral color aberration. This greatly simplifies the optical design process, which can address minimizing spherical aberration, astigmatism, axial color and field curvature while ignoring the aforementioned aberrations which are inherently canceled by the symmetry. This results in better optical performance and/or fewer required optical elements compared to conventional microscope designs.

As already mentioned, the first and second lens assemblies 20 and 22 are infinity corrected, meaning that the image of an object at the object plane 30 exits first lens assembly 20 towards stop 26 as a collimated image, and the collimated image entering second lens assembly 22 is brought to focus at FPA image sensor 28. According to a particularly preferred subset of implementations, the location of stop 26 is chosen to be the back focal plane of each lens assembly 20 and 22, so that the optical system is telecentric.

In the examples detailed herein and illustrated in the drawings, first and second lens arrangements 20 and 22 are implemented using refractive lenses. It should be noted however that the same principles may be used to advantage in implementations employing reflective lenses for the first and second lens arrangements, or with various arrangements combining refractive and reflective elements, referred to as catadioptric assemblies.

Turning now to the specific example of FIG. 1A, there is shown a non-limiting exemplary implementation of the present invention in which first and second lens arrangements 20 and 22 each includes one singlet lens and two doublets, totaling 8 surfaces with optical power for each lens arrangement. The surfaces are numbered sequentially from the object plane 30 to FPA image sensor plane 28, with the stop 26 occupying a position as the $9^{th}$ element.

The details of this non-limiting exemplary optical arrangement are provided in a table presented here as FIG.

1B, which provides for each surface: a radius of curvature, a distance along the optical axis (or central ray path) to the next surface, the intervening material for the lens (blank for air spaces), and the diameter of the surface. The object plane ("OBJ") 30 and the FPA image sensor ("IMA") 28 are planar, and hence have infinite radius of curvature. All dimensions are in millimeters.

FIG. 1C presents a table quantifying the contribution of each surface to each of 7 types of optical aberration as listed across the tops of the columns. The aberrations are quantified by their Seidel aberration coefficients as calculated by the ZEMAX™ Optical Design Program. By looking at the values for coma, distortion and lateral color pairwise, comparing surface 1 with surface 17, surface 2 with surface 16, surface 3 with surface 15 etc., it will be noted that the values are very closely equal but opposite. As a result, substantially independent of the net value for each lens assembly separately, the overall cumulative aberration for coma, distortion and lateral color substantially cancel out. These types of aberration can therefore be ignored during optimization of the optical components.

In contrast, the contribution of each surface to spherical aberration, field curvature, astigmatism and axial color are similar but of the same sign, and therefore do not cancel out. In order to minimize these aberrations, the surfaces of each lens arrangement should be optimized to minimize the total sum of spherical aberration, astigmatism, field curvature and axial color for each lens assembly individually, and hence for the overall optical system. The fact that a smaller number of variables need to be minimized greatly facilitates reaching improved optical performance with a given number of surfaces. In the further examples illustrated below, a larger number of surfaces are used, typically three singlet lenses and one doublet lens with a total of 9 surfaces for each lens assembly, which allows further optimization of the arrangement for aberration reduction and telecentricity. All of the examples illustrated are non-limiting, and a wide range of lens combinations and numbers of surfaces may be used, as will be clear to one ordinarily skilled in the art.

The FPA image sensor used to implement the present invention is typically a CMOS image sensor, and is provided with the various driving circuitry, readout circuitry, and complementary image processing circuitry to generate images for output to data storage and/or for immediate display on a monitor. All such details are standard practice in the field of microscopy and will not be further described herein.

The basic embodiment of FIG. 1A is suitable for use with transmissive illumination of a sample or with dark-field illumination, but does not provide for bright-field (EPI) illumination through the microscope. A number of particularly preferred variant implementations described below employ at least one beam splitter element to allow introduction into the light path of illumination directed towards the object.

In the non-limiting example of FIG. 2, the beam splitter 32 is incorporated on a diagonal plane of a beam splitter cube 34. In order to maintain symmetry of the light paths on both sides of the stop, a compensating element 36 have similar optical properties to beam splitter cube 34 is also deployed in the light path. Beam splitter cube 34 and compensating element 36 are located on opposite sides of physical stop 26. In the particularly preferred implementation illustrated in FIG. 2, beam splitter cube 34 and compensating element 36 are both located between first lens assembly 20 and second lens assembly 22, on either side of stop 26. Beam splitter cube 34 can be on either side of the stop, and is shown here on the side adjacent to first lens assembly 20.

The microscope as illustrated preferably also includes an illumination source 38 and an illumination optical arrangement 40 configured to direct illumination from illumination source 38 via beam splitter cube 34 into first lens assembly 20 so as to illuminate the object plane 30. The illumination source 38 and illumination optical arrangement 40 may provide any desired type of illumination, depending on the microscopy technique to be used, using visible light, near infrared or ultraviolet, providing full-field illumination or scanning illumination, polarized or unpolarized, and with or without spectral filters. In the embodiment illustrate here, a slot 42 is provided for insertion of a polarizer or filter. One or more mirror 44 may be provided to fold the illumination path for convenient placement of the illumination optical arrangement.

According to one subset of illumination arrangements considered particularly valuable for uniformity of illumination, illumination optical arrangement 40 includes an arrangement of lenses configured to generate an image of illumination source 38 at the back focal plane of first lens assembly 20, thereby generating Köhler illumination, where each point of the illumination source generates a parallel beams of illumination illuminating the object plane. In the preferred case of telecentric optics, the back focal plane of the first (and second) lens assembly is at physical stop 26, so the image of the illumination source is configured to be at the plane of physical stop 26. In the case illustrated here where beam splitter cube 34 is on the objective side of the stop, the illumination source image is generated at a plane 46 which is optically equivalent to the physical stop (via the alternative light path reflected by beam splitter 32). An illumination stop 48 controls the illumination field. Clearly, the Köhler illumination option is only one of many possible illumination arrangements, and other options also fall within the scope of the present invention.

Beam splitter 32 may be any type of beam splitter, and is chosen according to the intended application for which the microscope is to be used. In a first group of implementations, beam splitter 32 is a metallic beam splitter, e.g., a semi-silvered mirror. In other applications, beam splitter 32 is a polarizing beam splitter, while in a further set of applications, beam splitter 32 is a dichroic beam splitter with wavelength sensitivity for which wavelengths are transmitted and which are reflected. Again, depending upon the application, various additional filters or polarized analyzers 50 may be provided, for example, in a slot between second lens arrangement 22 and FPA image sensor 28. Other locations for filters or analyzers are also possible.

As mentioned, compensating element 36 is preferably included to maintain symmetry of the light paths through the two halves of the microscope. Advantageously, compensating element 36 is implemented as a second beam splitter cube with a diagonally-deployed second beam splitter 52, which may be of the same type, or of a different type, from beam splitter 32, depending on the application. Beam splitter 52 allows deployment of an optical instrument, represented schematically by arrow 54, associated with second beam splitter 52 and employing the second beam splitter as an optical port to the microscope. Non-limiting but particularly preferred examples of optical instruments 54 which may be associated with the optical port include: a laser illumination device; a vibrometer; and a spectrometer.

In the microscope of FIG. 2, first lens assembly 20 and second lens assembly 22 are deployed along a common axis which defines the optical axis of the microscope. This configuration is appropriate for a "tube" configuration microscope. FIGS. 3A-5 illustrate a number of variant implementations which are optically equivalent, or near-equivalent, to the design of FIG. 2, but in which the optical axis is folded to achieve alternative form factors which may be advantageous for certain applications, and may offer enhanced compactness of the design.

Figure 3A:
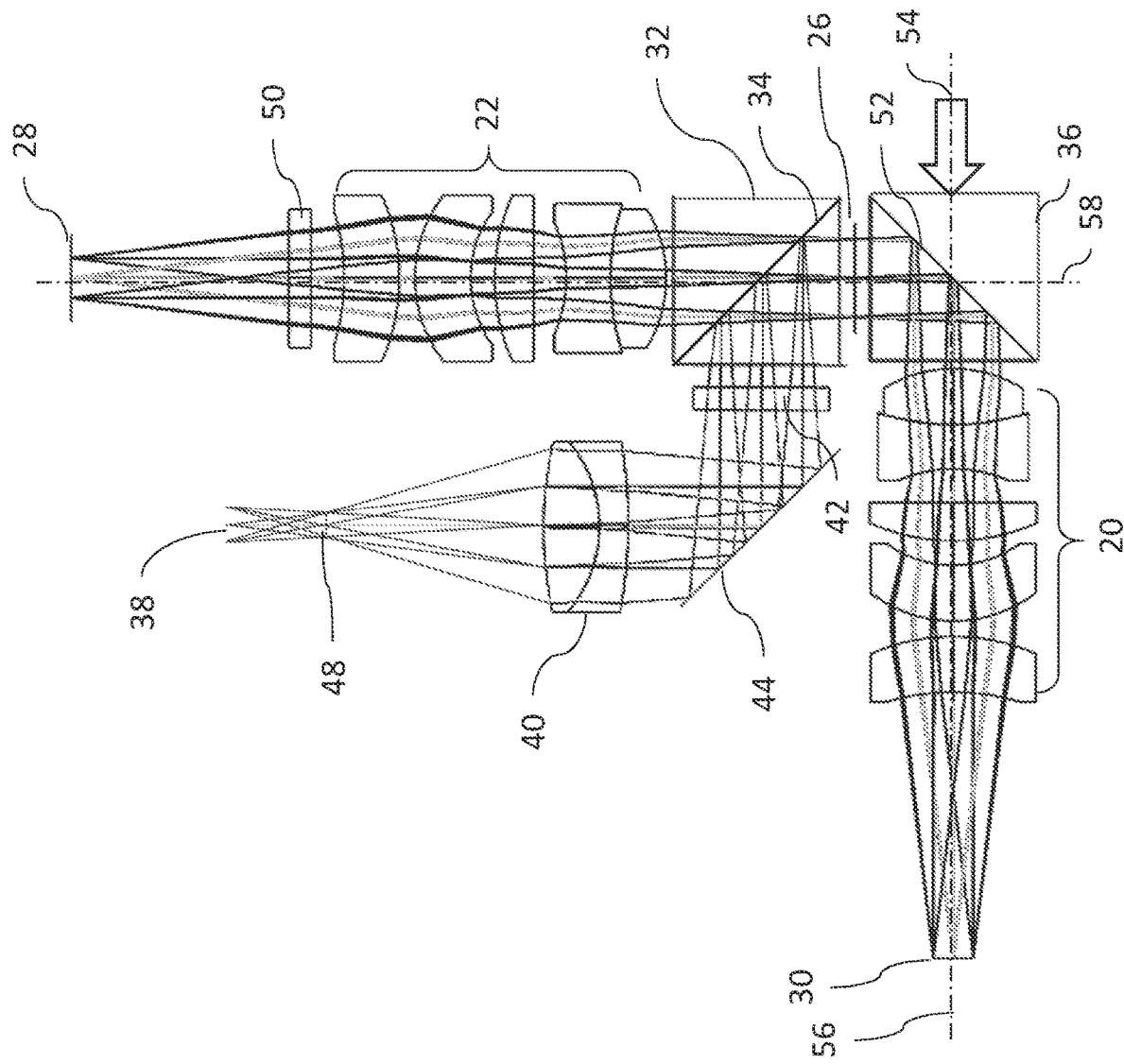
FIGS. 3A and 3B are schematic representations of a variant implementation of the unit magnification microscope of FIG. 2 in an L-shaped configuration, with and without an auxiliary optical port, respectively.

By way of example, FIG. 3A illustrates a microscope structure which is essentially the same as that of FIG. 2, but in which at least one lens, and preferably the entirety, of first lens assembly 20 is aligned on a first optical axis 56 and at least one lens, and preferably the entirety, of second lens assembly 22 is aligned on a second optical axis 58, perpendicular to the first optical axis 56. This results in what can be referred to as an "L-shape" design. Folding of the optical axis is performed by reflection at second beam splitter 52, which is here implemented as part of second beam splitter cube 36 on the objective side of stop 26. The straight-through channel of second beam splitter 52 may be used as an auxiliary optical port, as described above. The first (illumination) beam splitter cube 32 is here deployed on the tube lens side of the stop.

Figure 3B:
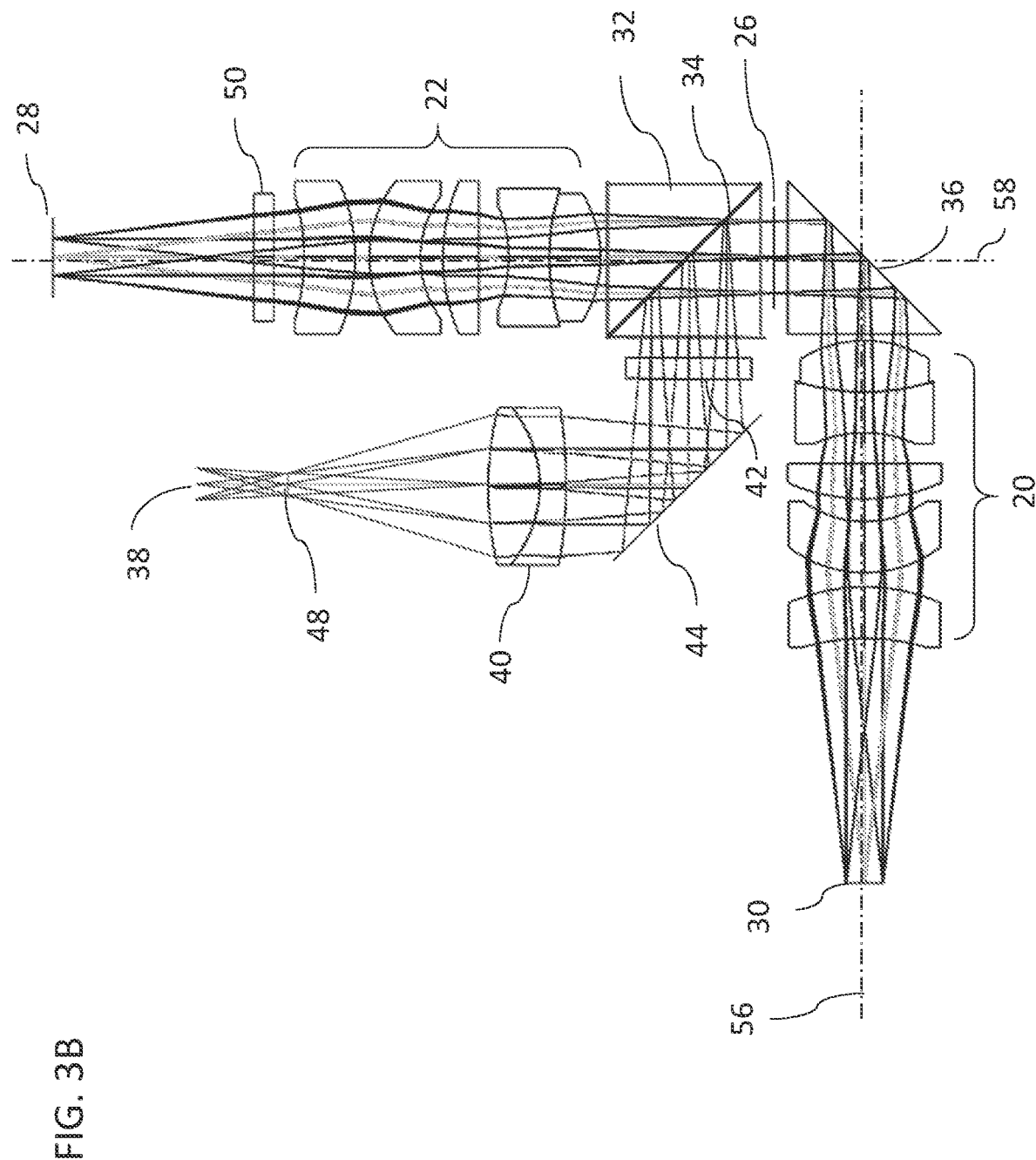

FIG. 3B illustrates a microscope structure which is optically and geometrically identical to that of FIG. 3A, but without an auxiliary optical port. In this case, compensating element 36 is advantageously implemented as a prism reflector.

Figure 4A:
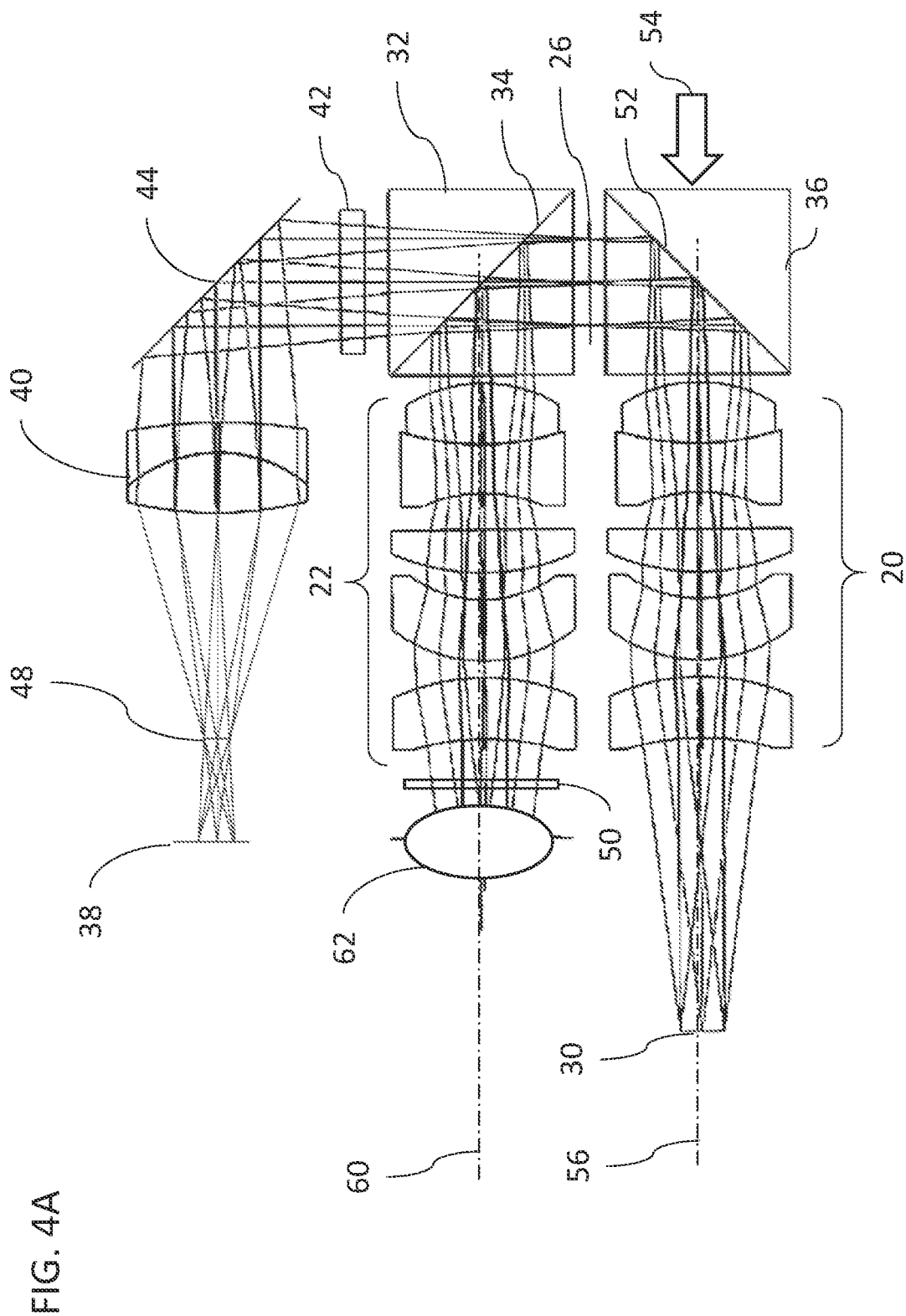
FIGS. 4A and 4B are schematic representations of a variant implementation of the unit magnification microscope of FIG. 2 in a U-shaped configuration, with and without an auxiliary optical port, respectively.
Figure 4B:
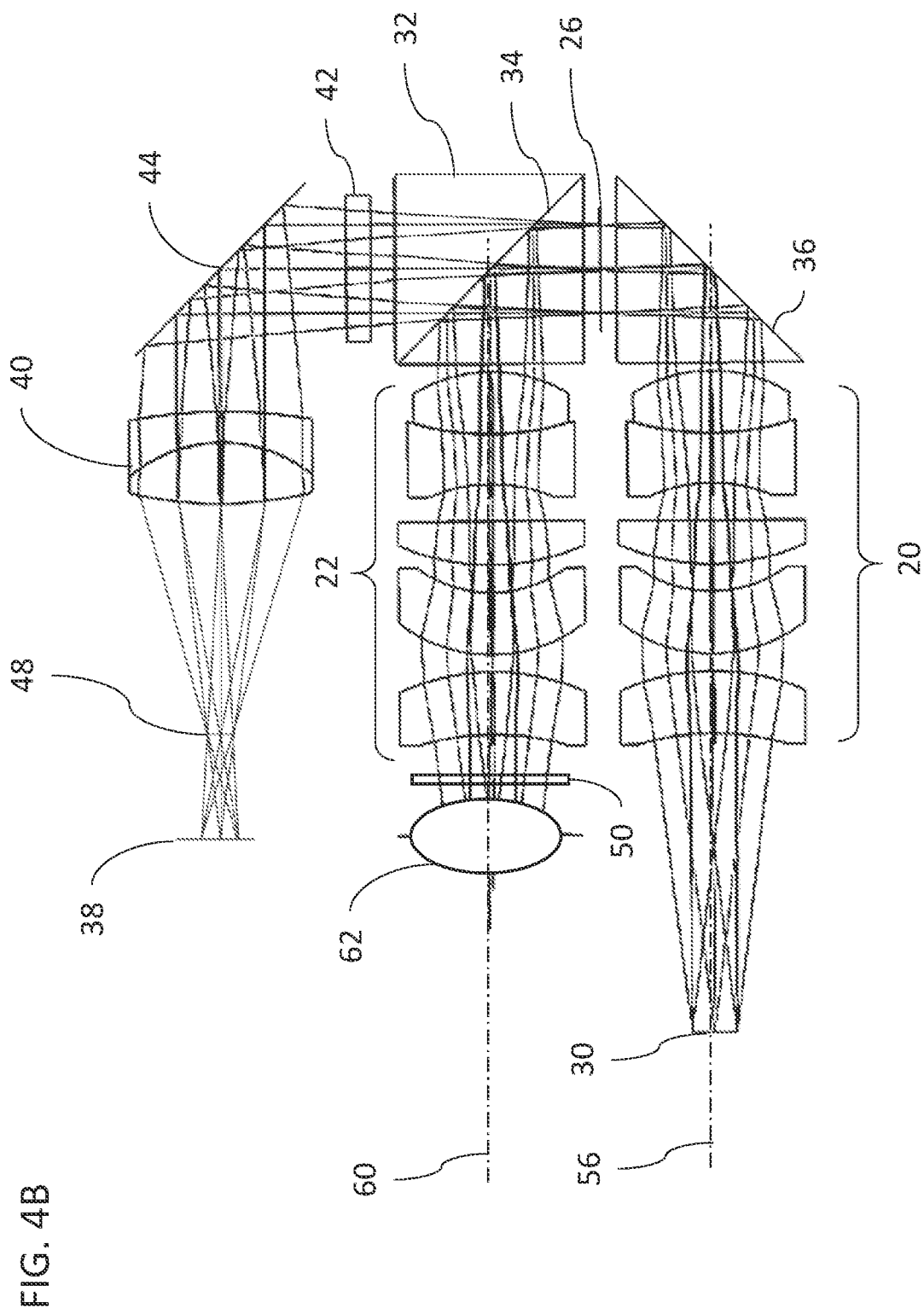
Figure 5:
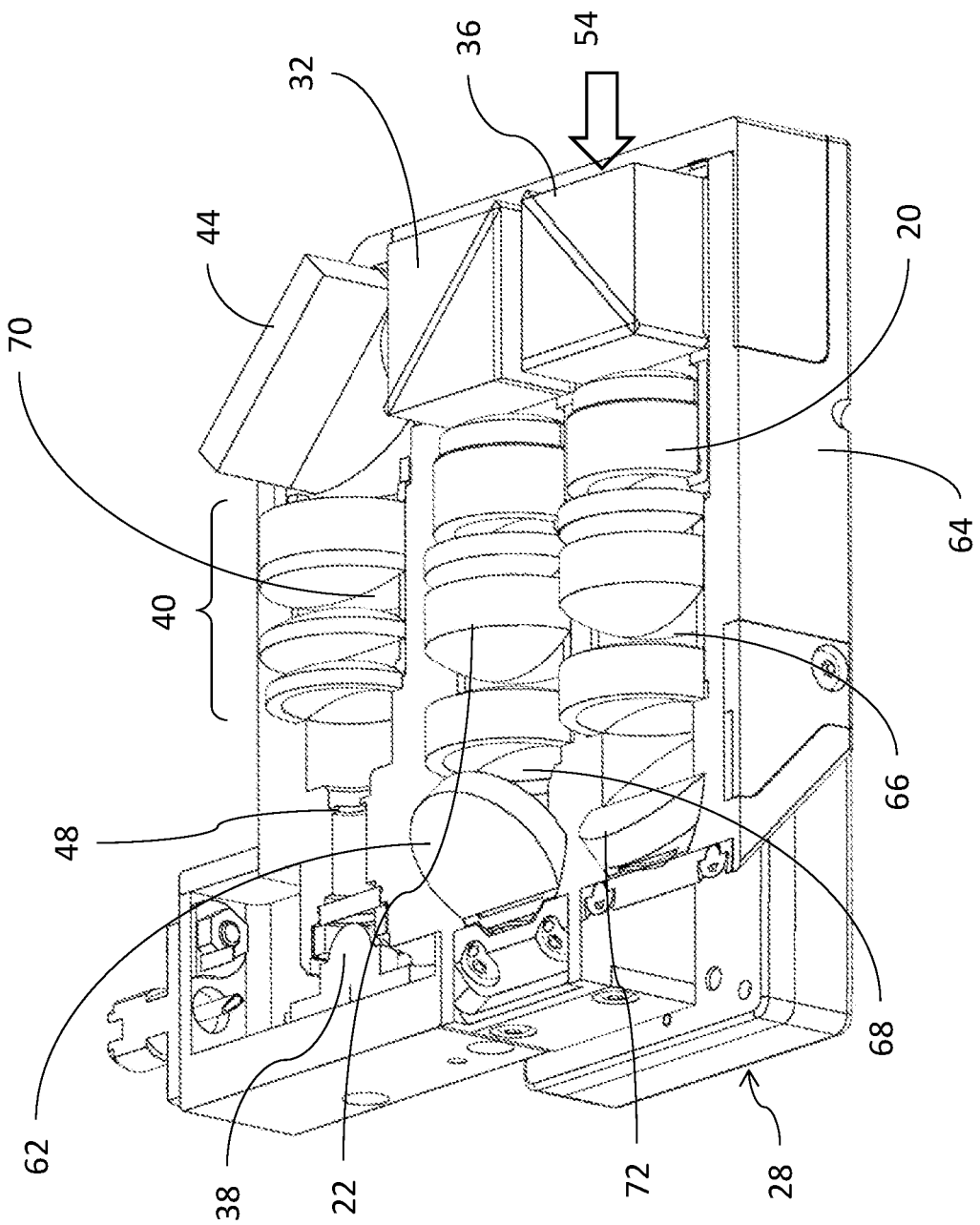
FIG. 5 is a schematic isometric view of an implementation of the optical arrangement of FIG. 4A in a rigid housing, with an upper part of the housing removed.

FIGS. 4A and 4B illustrate further structural arrangements which are optically equivalent to the devices of FIGS. 3A and 3B, respectively, but in which the light path of the microscope is further folded so that at least one lens, and preferably the entirety, of first lens assembly 20 is aligned on a first optical axis 56 and at least one lens, and preferably the entirety, of second lens assembly 22 is aligned on a second optical axis 60 parallel to first optical axis 56. In this case, the primary optical channel through the microscope is folded twice, preferably at each of compensating element 36 and beam splitter cube 32. The result is a highly compact configuration, where the primary light path through the microscope is twice folded, and may be referred to as a "U-shape" or "horseshoe" design. In order to provide sufficient volume for the FPA image sensor 28 (not visible in these drawings), a folding mirror 62 folds the light emerging from the second lens assembly 22 upwards, out of the plane of the optical axes.

The drawings thus far have represented the various optical arrangements schematically, showing the optical components only. In each case, it is understood that the optical components are housed in a suitable support structure configured to support the components in the desired relative positions. For the in-line configurations of FIGS. 1A and 2, a conventional tube form-factor housing is typically appropriate. For the L-shape and U-shape implementations, the required positions of the components are advantageously maintained by providing a rigid housing, optionally implemented using unitary block of rigid material, supporting the first and second lens assemblies 20 and 22. One such non-limiting example, corresponding to the optical configuration of FIG. 4A, is shown schematically in FIG. 5 with a cover removed. The lenses of first lens assembly 20 are here deployed within a first hollow channel 66 formed in the rigid housing 64, and the lenses of second lens assembly 22 are deployed within a second hollow channel 68 formed in rigid housing 64. In this example, longitudinal axes (i.e., central axes of what is typically a contoured cylinder) of channels 66 and 68 are parallel, corresponding to the parallel optical axes 56 and 60 of FIG. 4A. In this case, illumination optics 40 is deployed in a third hollow channel 70, which is again parallel to channels 66 and 68. FPA image sensor 28 itself is not directly visible in FIG. 5, but the reference numeral with an arrow head indicates the sensor housing which extends beneath the assembly as illustrated and houses the image sensor itself.

The position of the various optical components within the channels is typically fixed. Optionally, various adjustment mechanisms (not shown) may be provided for fine tuning alignment of the components during factory assembly, as is known in the art, but no adjustment is typically needed during use. Focus is achieved by adjusting relative positioning of the entire microscope relative to the object being viewed, to bring the object into the object plane of the optics.

In the implementation shown here, in addition to folding mirror 62 which folds the optical axis downwards as illustrated, towards FPA image sensor 28 which is located beneath the housing in the orientation illustrated, an additional folding mirror 72 is illustrated here, deployed to fold the optical axis of the objective upwards as shown, to an object plane located above the device as illustrated. The illustrated structure is closed with another complementary-shaped housing portion which mates with, and closes, the half housing as illustrated here, leaving an aperture above folding mirror 72 for the light path to the object plane.

Figure 6:
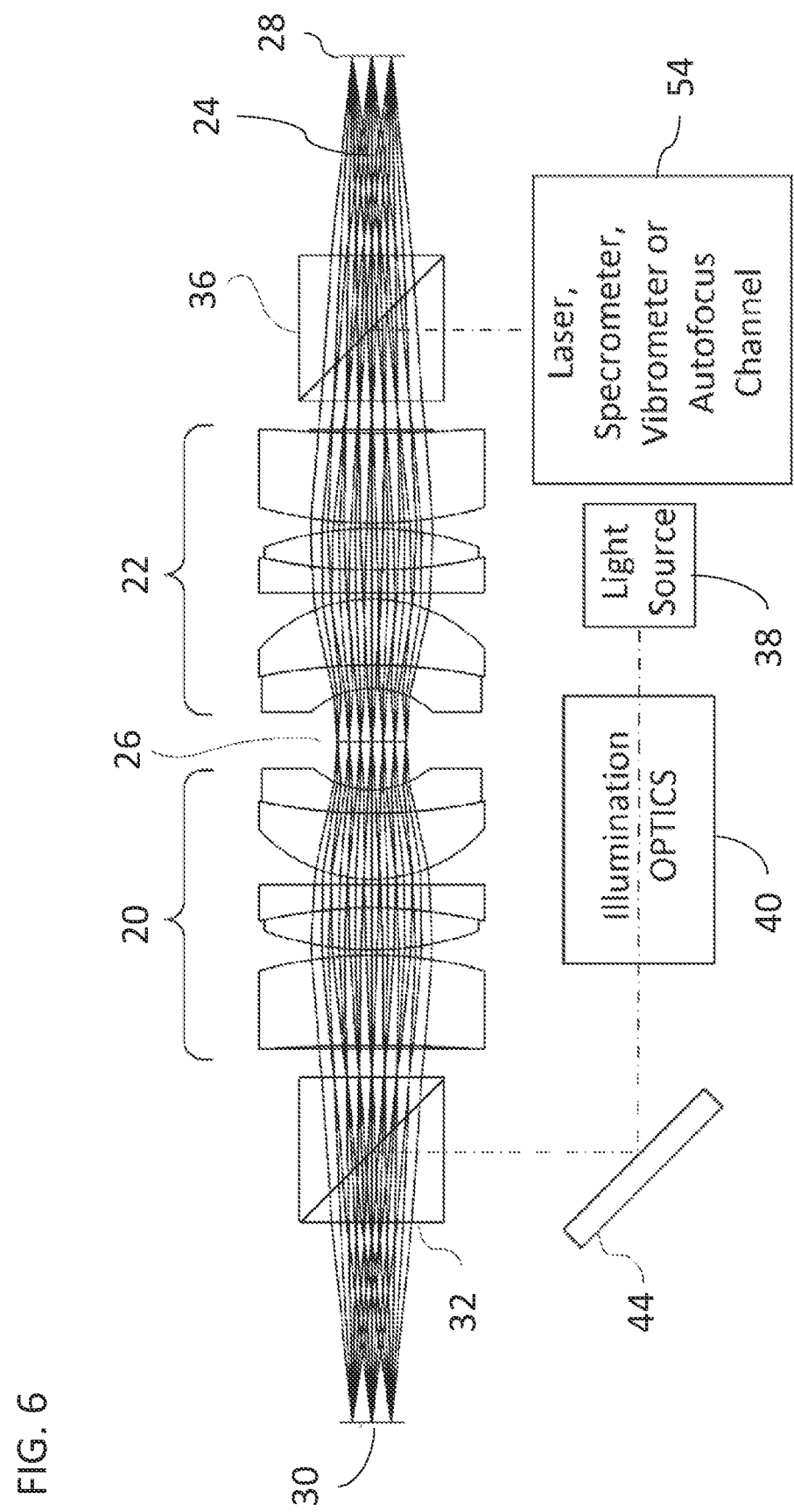
FIG. 6 is a schematic representation of a further variant implementation of the unit magnification microscope of FIG. 2 with deployment of beam splitting cubes external to the lens assemblies.

The above positioning of beam splitter cube 32 and compensating element 36 between the first and second lens assemblies is believed to be particularly advantageous, since the parallel-faces "window" formed by each of these elements has minimal additional aberration-generating effect on the collimated image present between the two lens assemblies. It should be noted however that alternative implementations may position the beam splitter and compensating element outside the lens assemblies, i.e., with one of them in the light path between first lens assembly 20 and the object plane 30 and the other between second lens assembly 22 and FPA image sensor 28. One such example is illustrated in FIG. 6, where beam splitter cube 32 is located between first lens assembly 20 and the object plane 30 for introducing illumination from light source 38 passing via illumination optics 40 and an illumination folding mirror 44. Compensating element 36, implemented as a second beam splitter cube, provides an optical port as before for integration of an external device 54. In all other respects, this arrangement has analogous components similarly labelled to the above implementations and functions similarly.

As discussed above, particular advantages are achieved by maintaining symmetry of the optical configuration which contributes to cancelling out of various types of aberrations. The symmetry between first and second lens assemblies 20 and 22 is preferably achieved by using identical lens assemblies, subject to the limitations of manufacturing and assembly tolerances. Similarly, where a beam splitter cube 32 is used, the optical impact of the cube is preferably symmetrically offset by a corresponding compensating element 36, as per the above examples. Nevertheless, particularly for relatively thin elements with no optical power, and particularly where they oriented perpendicular to optical axis, asymmetric deployment may not significantly adversely affect the overall optical performance. Hence, for example, deployment of a thin filter or polarizing analyzer 50 in various of the above implementations is considered an acceptable departure from symmetry.

Figure 7:
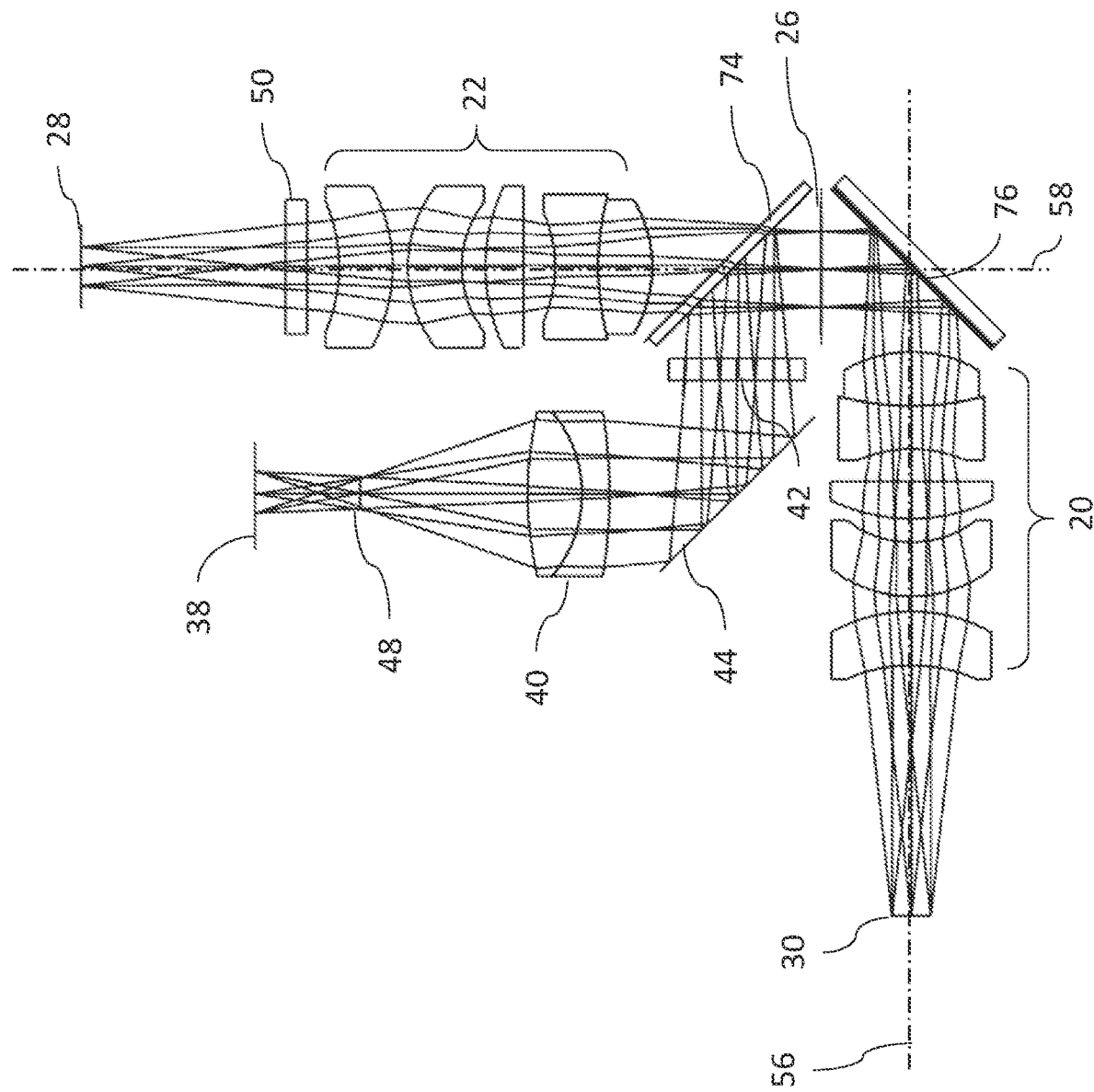
FIG. 7 is a schematic representation of a variant implementation of the unit magnification microscope of FIG. 3B implemented using a diagonally-deployed beam splitter.

A further example of tolerable imperfect symmetry is illustrated in FIG. 7, where a flat, diagonally-deployed beam splitter 74 is located in the light path between first lens assembly 20 and second lens assembly 22. Folding of the light path is here performed by a mirror 76. The overall optical configuration is essentially the same in FIG. 7 as in FIG. 3B, described above, but the image illumination passing through beam splitter 74 undergoes refraction at the front and back surfaces of the beam splitter. For a relatively thin flat beam splitter, for example, below about 2 mm thickness, the overall impact on image quality has been found to be within acceptable limits. In all other respects, the structure and function of FIG. 7 is equivalent to that of FIG. 3B.

Figure 8:
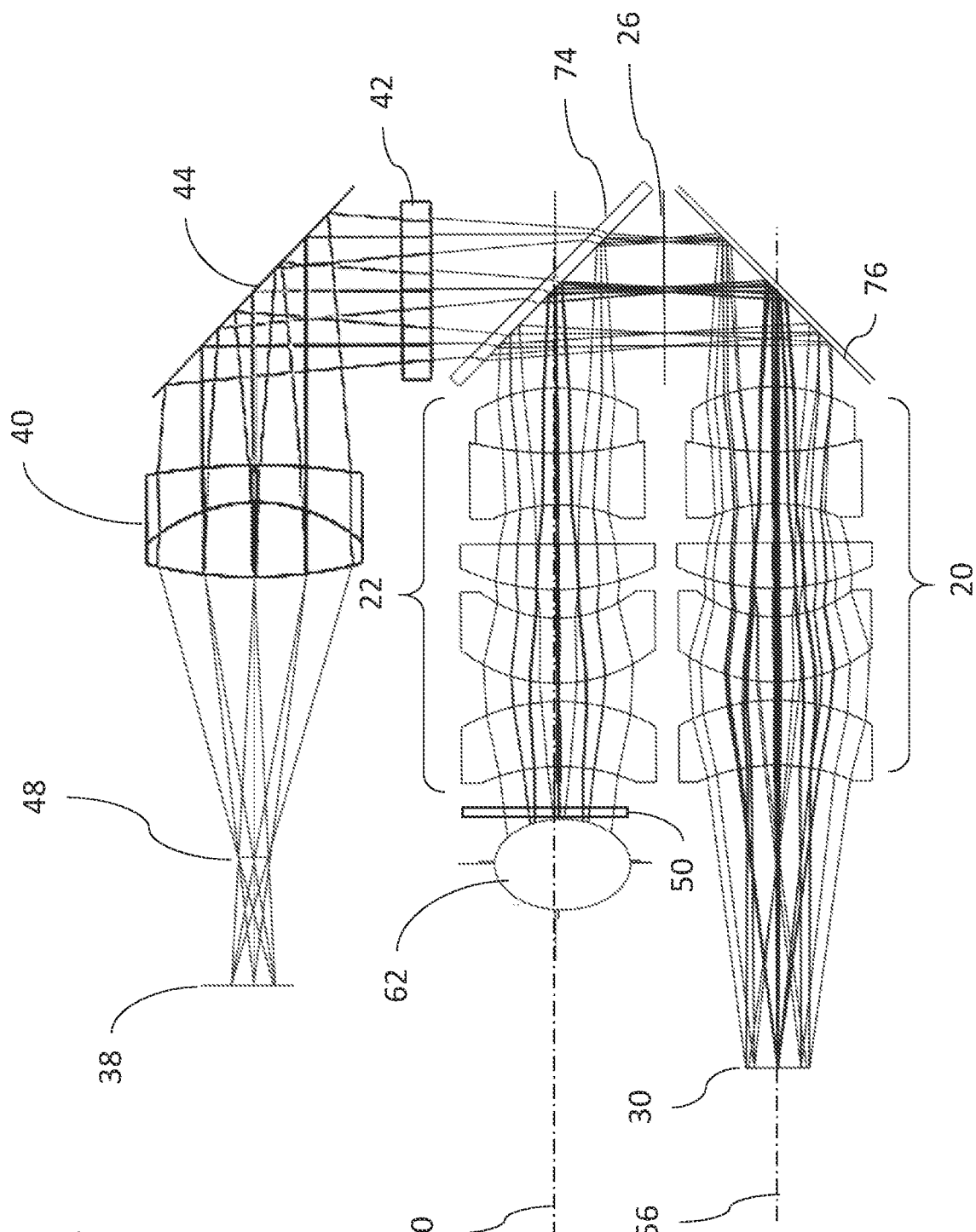
FIG. 8 is a schematic representation of a variant implementation of the unit magnification microscope of FIG. 4B implemented using a diagonally-deployed beam splitter.

FIG. 8 shows a similar implementation, but in this case, the optical configuration is a U-shape implementation, similar to that of FIG. 4B. In this case, the use of a diagonally-deployed beam splitter need not impact image quality at all, since the image illumination is reflected from the front surface of beam splitter 74 and does not undergo refraction. Any impact on the illumination channel is typically not significant, and can be compensated for by simple refocusing of the illumination source at the plane of the stop (for Köhler illumination). In all other respects, the structure and function of FIG. 8 is equivalent to that of FIG. 4B.

Figure 9:
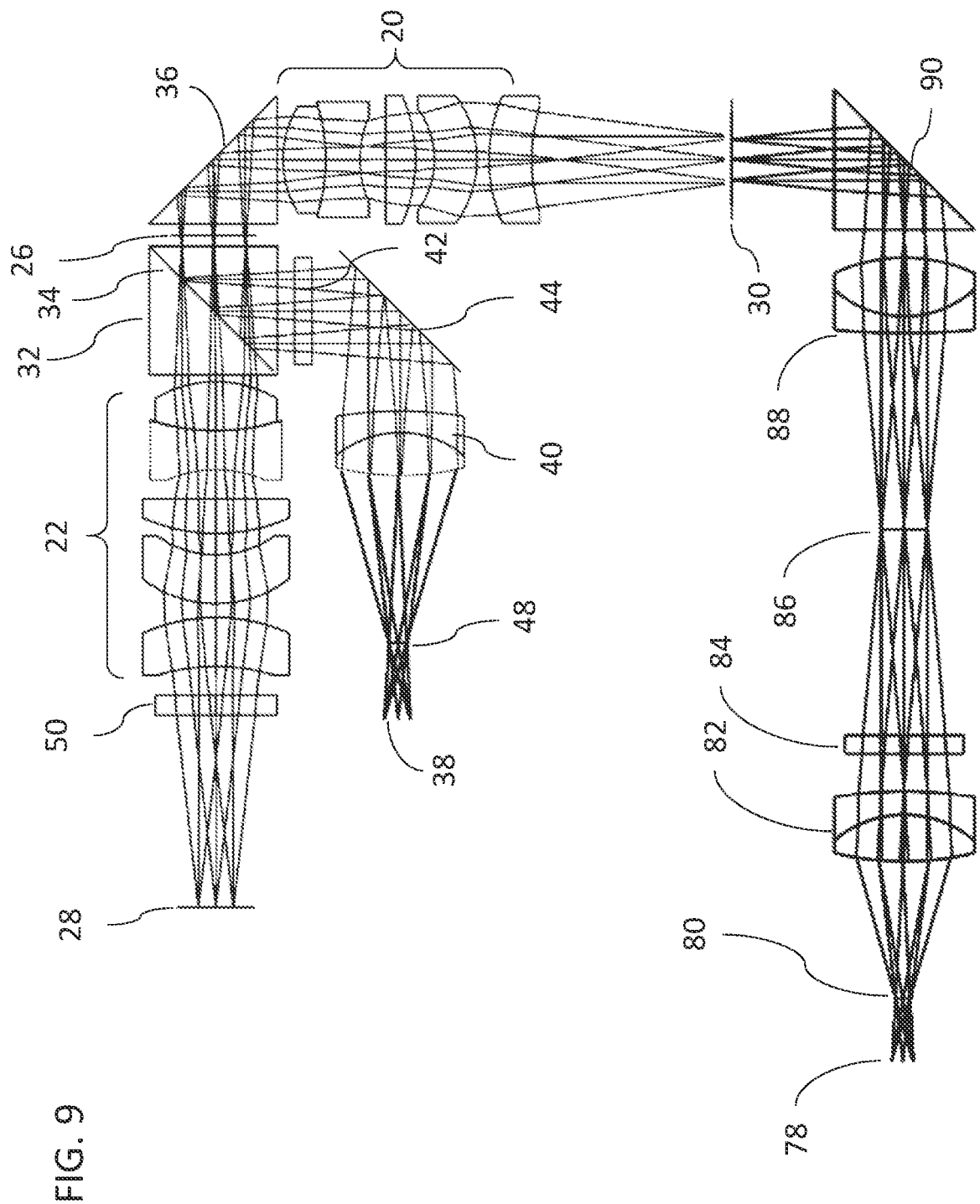
FIG. 9 is a schematic representation of a unit magnification microscope system based on the microscope of FIG. 3B with a transmitted—illumination system and adapted to perform phase-contrast microscopy.

Turning finally to FIG. 9, this illustrates a microscope system in which the microscope of FIG. 3B is supplemented with a transmitted—illumination system behind/beyond the object plane, to provide additional functionality, and in the particular implementation shown here, suitable for implementing phase-contrast microscopy. For the purpose of phase-contrast microscopy, the transmitted—illumination system includes a light source having a light-source aperture stop 78, a Köhler field stop 80, first illumination optics 82, optionally an illumination filter 84, a phase stop 86, second illumination optics 88, and optionally a folding reflector 90 to direct the illumination towards a specimen in object plane 30. The microscope optical configuration is essentially as described above, but with stop 26 between first and second lens assemblies 20 and 22 supplemented with a phase plate. Aperture stop 78, phase stop 86 and phase plate at stop 26 are all conjugate planes. The microscope structure illustrated here also includes the aforementioned front illumination arrangement, thereby providing flexibility for multiple imaging modalities. Clearly, if only phase-contrast microscopy is required, the microscope may optionally be implemented as a simplified structure without beam splitters, such as was described above with reference to FIG. 1A.

The various implementations of the microscopes of the present invention are thus highly suited to a wide range of applications including, but not limited to: inspection of semiconductors, solar panels, LEDs, micro-electro-mechanical systems (MEMS), printed circuit boards, flat panel displays (FPD), optical metrology, wafer dicing, robotics, gemology evaluations, life-sciences, bio-med (including fluorescence microscopy, phase-contrast microscopy, cell imaging), and medical diagnostics.

It will be appreciated that the above descriptions are intended only to serve as examples, and that many other embodiments are possible within the scope of the present invention as defined in the appended claims.

What is claimed is:

1. A unit magnification microscope comprising:
   (a) a first lens assembly comprising a plurality of lenses forming an infinity-corrected objective for receiving light from an object located at an external focal plane of the first lens assembly;
   (b) a second lens assembly comprising a plurality of lenses, said second lens assembly being identical to said first lens assembly, said second lens assembly being mounted relative to said first lens assembly in an opposite orientation along a light path;
   (c) a physical stop located at a central point along the light path between said first lens assembly and said second lens assembly;
   (d) a beam splitter cube and a compensating element deployed in the light path, said beam splitter cube being deployed to allow introduction of illumination directed towards the object into the light path, wherein said beam splitter cube and said compensating element have similar optical properties and are located on opposite sides of said physical stop; and
   (e) a focal plane array image sensor mounted at an external focal plane of the second lens assembly, such that light from the object is focused with unit magnification on said focal plane array image sensor after passing along the light path through said first lens assembly, said physical stop and said second lens assembly.

2. The microscope of claim 1, wherein said beam splitter cube and said compensating element are both located between said first lens assembly and said second lens assembly.

3. The microscope of claim 2, further comprising an illumination source, and an illumination optical arrangement comprising a lens arrangement configured to direct illumination from said illumination source via said beam splitter cube into said first lens assembly.

4. The microscope of claim 3, wherein said physical stop is located at a back focal plane of said first lens assembly and of said second lens assembly, and wherein said illumination optical arrangement includes an arrangement of lenses configured to generate an image of said illumination source at a plane of said physical stop or at a plane optically equivalent to said plane of said physical stop.

5. The microscope of claim 1, wherein said beam splitter cube and said compensating element are located, respectively, in the light path between said first lens assembly and the object and in the light path between said second lens assembly and the focal plane array image sensor, or conversely.

6. The microscope of claim 1, wherein said beam splitter cube includes a metallic beam splitter.

7. The microscope of claim 1, wherein said beam splitter cube includes a polarizing beam splitter.

8. The microscope of claim 1, wherein said beam splitter cube includes a dichroic beam splitter.

9. The microscope of claim 1, wherein said compensating element is implemented as a second beam splitter cube.

10. The microscope of claim 9, further comprising an optical instrument associated with said second beam splitter cube and employing said second beam splitter cube as an optical port to the microscope, said optical instrument being selected from the group consisting of: a laser illumination device; a vibrometer; and a spectrometer.

11. The microscope of claim 1, wherein said first lens assembly and said second lens assembly are deployed along a common optical axis.

12. The microscope of claim 1, wherein a folding reflector is deployed in the light path such that at least one lens of said first lens assembly is aligned on a first optical axis and wherein at least one lens of said second lens assembly is aligned on a second optical axis, said first and second optical axes being perpendicular.

13. The microscope of claim 1, wherein two folding reflectors are deployed in the light path such that at least one lens of said first lens assembly is aligned on a first optical axis and wherein at least one lens of said second lens assembly is aligned on a second optical axis, said first and second optical axes being parallel.

14. The microscope of claim 13, further comprising a rigid housing supporting said first and second lens assemblies, wherein said plurality of lenses of said first lens assembly are deployed within a first hollow channel formed in said rigid housing, and wherein said plurality of lenses of said second lens assembly are deployed within a second hollow channel formed in said rigid housing.

15. The microscope of claim 1, wherein said physical stop is located at a back focal plane of said first lens assembly and of said second lens assembly.

16. The microscope of claim 1, wherein said plurality of lenses of said first and second lens assemblies are refractive lenses.

\* \* \* \* \*